United States Patent Office 3,726,848
Patented Apr. 10, 1973

3,726,848
POLYMERISATION OF STYRENE AND RELATED MONOMERS USING A TWO STAGE CONTINUOUS HEATING CYCLE
John Mansel Squire, Dollar, Scotland, and Geoffrey James Gammon, Ashford, England, assignors to The British Petroleum Company Limited, London, England
No Drawing. Filed June 9, 1970, Ser. No. 44,892
Int. Cl. C08f 7/04, 7/06
U.S. Cl. 260—91.5
8 Claims

ABSTRACT OF THE DISCLOSURE

A vinyl aromatic monomer is polymerised with two initators of different half lives using a two stage continuous temperature rise. The temperature cycle is an initial increase to 105–125° C. in less than 1 hour and a further rise to between 130 and 150° C. in up to an hour or more.

---

This invention relates to a process for the polymerisation of vinyl aromatic compounds in the presence of free radical catalysts.

U.S. Pat. 2,907,756 discloses a three stage process for the polymerisation of styrene using a two component initiator system and a stepwise heating cycle in which the temperature is raised from 90° to 135° C. in three separate stages: stage 1—the temperature is maintained at 90°–100° C. for two to three hours: stage 2—the temperature is raised to 115° C. and is maintained at this temperature for two hours: stage 3—the temperature is raised to 135° C. and is maintained at this temperature for one hour.

The overall cycle time is 7 hours.

In a stepwise cycle of this type, there must be a progressive reduction in polymerisation rate along a given temperature plateau as the concentration of the initiator which is most active at that temperature decreases. For instance, from the heating cycle and conversion-time relationship given in U.S. Pat. 2,907,756 (FIGS. 2 and 3) it is apparent that there was a reduction in polymerisation rate at 100° C. from 19% per hour in the second hour to 9% per hour in the third hour of the cycle as a result of the diminishing benzoyl peroxide concentration during that period. Thus it is not possible to achieve constant polymerisation rates by the use of two initiators and a stepwise heating cycle.

We have shown that this difficulty may be overcome and cycle time reduced (to 3½ to 4 hours) by programming a rise in temperature over the whole reaction period. Three initiators at least are desirable to maintain a constant rate.

We have now discovered that the time of polymerisation may be still further reduced and two initiators used satisfactorily by using a two-stage linear programmed temperature cycle. A longer proportion of the reaction period is spent at the higher end of the temperature range, and as a lower initiator concentration is required in this region to obtain a given polymerisation rate a cost saving can be made.

Thus according to the present invention is provided a process for the polymerisation of a vinyl aromatic monomer which process comprises polymerising the monomer in the presence of two or more free radical initiators, at least one having a half life of 1–15 hours at 70° C. and less than 1 hour at 100° C. and at least one other having a half life of greater than 15 hours at 100° C. and 0.1–10 hours at 130° C. under a programmed temperature cycle between 50 to 150° C., the cycle having a continuous initial increase in temperature to 105–125° C., in less than 1 hour and a subsequent continuous increase from between 105–125° C. to between 130 and 150° C. in up to 1 hour or more.

More suitable low temperature initiators include lauroyl peroxide, octanoyl peroxide, 2,4-dichlorobenzoyl peroxide and benzoyl peroxide.

Suitably high temperature initiators include t-butyl perbenzoate, dicumyl peroxide, di-t-butyl peroxide and di-t-butyl perphthalate.

The required concentrations in the mixture of initiators to give almost constant rate is best found initially by simple small scale kinetic experiments.

Preferably the programmed temperature ranges are 70° to 110–120° C. and 110–120° C. to 140° C. Most preferably the lower and upper limits are 90° C. and 135° C. respectively.

The duration of the first programmed temperature rise is preferably 15–30 minutes, and that of the second 1–3 hours.

The short low temperature period and longer high temperature period mean that only two initiators need be employed for an almost constant rate of polymerisation to high conversion (ca. 90%), although more may be used if desired.

If a particularly low residual monomer content is wanted a further period at high temperature, preferably 135° C., may be added.

Such programmed heating cycles mean that less heat needs to be removed from the reactor by external cooling, for the heat of polymerisation may be used to bring about the rise in temperature.

Suitable monomers include styrene, ortho- and para-monochlorostyrenes, dichloro-styrene and vinyl naphthalene.

The preferred monomer is styrene.

The programmed temperature cycle of this invention can be used in any suspension polymerisation step, for example for the second stage polymerisation of a rubber reinforced polystyrene or ABS where prepolymerisation is carried out in bulk until phase inversion has taken place.

By a process according to the present invention, the initiator system can be tailored to fit a given heating cycle, the duration of which is governed by the heat transfer characteristics of the reactors for which the cycles are designed. This is in contrast to previous processes, in which the initiators are chosen first and the cycle times are dependent on these initiators.

In commercial operations for the production of polystyrene, the problem of heat transfer from within polymerisation vessels may be alleviated somewhat by performing the polymerisation in aqueous suspension (suspension process); the heat transfer capabilities of the reactor will govern the maximum polymerisation rate which can be controlled with safety.

The present invention is particularly applicable to a suspension process although it need not be limited to such.

Polymerisation to low or high molecular weight materials may be carried out.

To obtain polymers of low molecular weight (e.g. 30,000–200,000) a chain transfer may be added to the reaction mix or for example the initiator concentration may be increased.

Suitable chain transfer agents include mercaptans, e.g., n- and t-butyl-, n-amyl-, n-hexyl, n- and t-octyl-, n-decyl- and n- and t-dodecyl-mercaptan; halogenated hydrocarbons, e.g., carbon tetrachloride tetrachloroethylene, 1,1,2,2-tetrachloroethane, 1,2,3,4-tetrachlorobutane, 1,2,3-trichloropropane, hexabromoethane, alpha beta dibromostyrene and bromocyclohexane; and certain hydrocarbons, e.g., pentaphenyl ethane, 1,4-dihydrobenzene, 1,3-dihydronaphthalene and alpha methyl styrene dimer.

Preferably the chain transfer agent is t-dodecyl mercaptan.

Somewhat higher initiator concentrations are required in preparing low molecular weight polymers as the chain transfer agent has a retarding effect.

Alternatively molecular weight may be raised by adding a cross-linking agent such as divinyl benzene. Only a small amount of cross-linking agent must be added, as the object is simply to increase molecular weight without causing gel formation.

Conventional ingredients of suspension polymerisation recipes may be added, e.g., suspending agents and wetting agents.

Suitable suspending agents include water soluble protective colloids such as polyvinyl alcohol, hydroxyethyl cellulose, hydroxy propyl starch, styrene-maleic anhydride copolymers, and polyvinyl pyrrolidone.

Other suspending agents are sparingly soluble phosphates such as calcium, barium and magnesium phosphates, basic phosphates such as hydroxy apatite, finely divided inorganic substances such as clay, talc, barium sulphate or titanium dioxide. These may often be prepared in situ, for example, apatite may be made by adding sodium phosphate and calcium chloride to the reaction mix.

When using an inorganic suspending agent, control of suspension pH is important. For a stable suspension the pH should be in the range 5.0 to 8.0. When making a low molecular weight polymer the addition of a chain transfer agent would generally cause a drop in suspension pH. To counteract this a suitable alkaline substance may be added to buffer the system.

Suitable wetting agents include anionic surface active agents such as sodium caproate and sodium oleate, organic sulphates and sulphonates such as long chain alkyl sulphates and sulphonates, alkyl aromatic sulphonates, aryl alkyl polyether sulphonates, sodium salts of alkyl phosphates and the reaction product of tertiary butyl hydroperoxide and sodium formaldehyde sulphoxylate.

Further ingredients such as white mineral oil and stearic acid may also be added.

The invention is illustrated by the following examples.

EXAMPLES

Run 1.—An initiator composition comprising benzoyl peroxide (0.03%) and t-butylperbenzoate (0.13%) [all percentages quoted refer to actual initiator percentages based on styrene monomer] was added to 50 kg. of an aqueous suspension of styrene monomer (monomer/water ratio 1.39) containing a white mineral oil lubricant (580 g., 2.0%).

The suspension was stabilised by means of an apatite suspension system. Stearic acid (0.1%) was added to the mixture to act as a mould-release agent in the product.

The temperature of the agitated polymerisation mixture was raised from 90° C. to 135° C. over a period of 3½ hours according to the following time-temperature cycle:

90°–115° C./½ hour
115°–135° C./3 hours

After completion of the cycle, the suspension slurry was allowed to cool to room temperature and the polymer beads were washed first with dilute hydrochloric acid solution and then with water. The product was dried at ca. 75° C. for 2 hours.

Run 2.—The procedure outlined above for Run 1 was repeated except that the concentrations of benzoyl peroxide and t-butylperbenzoate employed were 0.08% and 0.15% respectively and the heating cycle was reduced to 3 hours as shown below:

90°–110° C./20 min.
110°–135° C./2 h. 40 min.

Run 3.—Run 3 was a repeat of Run 2 with the exception that no white mineral oil lubricant was incorporated in the polymer.

Run 4.—Run 4 was a repeat of Run 3 with the exception that the time/temperature cycle was increased to 3¼ hours by the addition of a 15 minute high-temperature "finishing" period (at 135° C.) to the cycle in order to achieve a further reduction of residual monomer content in the product.

Run 5.—The procedure outlined for Run 1 was repeated except that the following initiator concentrations and heating cycle were employed:

Benzoyl peroxide, 0.10%
t-Butylperbenzoate, 0.16%
Cycle:
  90°–110° C./20 min.
  110°–135° C./2 h. 10 min.

Run 6.—The procedure outlined above for Run 1 was repeated except that divinylbenzene (0.005% weight on styrene) was added to the initial reaction mixture. The clarity of the final product was not affected.

Some properties of the products obtained from Runs 1–6 are given in Table 1.

TABLE 1

High temperature cycles for styrene polymerisation—product properties

| Run number | 1 | 2 | 3 | 4 | 5 | 6 |
|---|---|---|---|---|---|---|
| Initiators: | | | | | | |
| Benzoyl peroxide, percent | 0.03 | 0.08 | 0.08 | 0.08 | 0.10 | 0.03 |
| t-Butylperbenzoate, percent | 0.13 | 0.15 | 0.15 | 0.15 | 0.16 | 0.13 |
| Cycle time, hr. | 3½ | 3 | 3 | 3¼ | 2½ | 3½ |
| Lubricant level, percent | 2.0 | 2.0 | | | 2.0 | 2.0 |
| Product properties: | | | | | | |
| Residual monomer content, percent | 0.35 | 0.20 | 0.10 | 0.08 | 0.20 | 0.20 |
| Solution viscosity (1% solution in toluene at 25° C.) cp | 1.12 | 1.07 | 1.10 | 1.10 | 1.01 | 1.18 |
| $\overline{Mw}^1$ (GPC) (×10$^{-5}$) | 2.69 | 2.32 | 2.53 | 2.60 | 2.11 | 3.01 |
| Tensile strength, p.s.i | 5,943 | 6,072 | 6,893 | 7,032 | 5,857 | 6,033 |
| Elongation at break, percent | 2.3 | 2.7 | 4.1 | 4.7 | 4.8 | 3.5 |
| Impact strength (ft.lb./in. notch) | 0.30 | 0.27 | 0.23 | 0.33 | 0.36 | 0.43 |
| Softening point, °C | 92.5 | 49.6 | 100 | 101 | 91.2 | 95.4 |
| Melt flow index (5 kg., 200° C.), g./10 min. | 7.3 | 9.2 | 6.1 | 5.3 | 15.4 | 5.4 |

[1] Weight-average molecular weight ($\overline{Mw}$) determined by gel permeation chromatography (G.P.C.).

It can be seen from the foregoing examples that the cycle time has been still further reduced to 2½ to 3½ hours as compared with 3½ to 4 hours for our earlier application Ser. No. 45,251 filed June 9, 1970, without harming the properties of the polymer produced.

We claim:

1. A process for the polymerisation of a vinyl aromatic monomer selected from the group consisting of styrene, ortho-chlorostyrene, para-chlorostyrene, dichlorostyrenes and vinylnaphthalene which comprises continuously increasing the polymerisation temperature in the range of 50–150° C. in two stages, the first stage being a continuous substantially linear increase in temperature to a temperature in the range of 105–125° C. in a time period of at least 15 minutes and less than 1 hour and the second stage being a continuous substantially linear increase from the said temperature in the range of 105–125° C. to a temperature in the range 130–150° C. over a time period greater than 1 hour in the presence of two organic peroxy polymerisation initiators, the first having a half life of 1–15 hours at 70° C. and less than 1 hour at 100° C. and the second having a half life of greater than 15 hours at 100° C. and 0.1 to 10 hours at 130° C.

2. Process according to claim 1 where the initiator having a half life of 1–15 hours at 70° C. and less than 1 hour at 100° C. is selected from the group consisting of lauroyl peroxide, octanoyl peroxide, 2,4-dichlorobenzoyl peroxide or benzoyl peroxide.

3. Process according to claim 1 where the initiator having a half life of greater than 15 hours at 100° C. and 0.1 to 10 hours at 130° C. is selected from the group consisting of t-butyl perbenzoate, dicumyl peroxide, di-t-butyl peroxide and di-t-butyl perphthalate.

4. Process according to claim 1 where the programmed temperature ranges are 70 to 110–120° C. and 110–120° C. to 140° C.

5. Process according to claim 1 where the lower and upper limits of the programmed temperature cycle are 90° C. and 135° C. respectively.

6. Process according to claim 1 where the first part of the programmed temperature cycle lasts between 15 and 30 minutes.

7. Process according to claim 1 where the second part of the programmed temperature cycle lasts between 1 and 3 hours.

8. A process for the polymerisation of a vinyl aromatic monomer selected from the group consisting of styrene, ortho-chlorostyrene, para-chlorostyrene, dichlorostyrenes and vinyl naphthalene which consists essentially of polymerising said vinyl aromatic monomer under a continuously increasing programmed temperature cycle in the range of 50 to 150° C. in two stages, the first stage being a continuous substantially linear increase in temperature to a temperature in the range of 105–125° C. in a time period of at least 15 minutes and less than 1 hour and the second stage being a continuous substantially linear increase from the said temperature in the range of 105–125° C. to a temperature in the range of 130–150° C. over a time period greater than 1 hour in the presence of a two component initiator system, the first component of which is selected from the group consisting of lauroyl peroxide, octanoyl peroxide, 2,4-dichlorobenzoyl peroxide and benzoyl peroxide, the second component of which is selected from the group consisting of t-butyl perbenzoate, dicumyl peroxide, di-t-butyl peroxide, and di-t-butyl perphthalate.

References Cited
UNITED STATES PATENTS

| | | | |
|---|---|---|---|
| 2,692,260 | 10/1954 | D'Alelio | 260—93.5 W |
| 2,907,756 | 10/1959 | Doak | 260—93.5 W |
| 3,293,233 | 12/1966 | Erchak et al. | 260—89.5 R |
| 3,425,966 | 2/1969 | Ronden et al. | 260—93.5 W |
| 3,491,071 | 1/1970 | Lanzo | 260—85.5 P |
| 3,585,176 | 6/1971 | Gerritsen et al. | 260—93.5 W |
| 3,480,606 | 11/1969 | Thomas | 260—85.5 P |

HARRY WONG, Jr., Primary Examiner

U.S. Cl. X.R.

260—87.5 R, 88.2 C, 93.5 S, 93.5 W